United States Patent [19]

Sugimoto et al.

[11] Patent Number: 5,585,692

[45] Date of Patent: Dec. 17, 1996

[54] FLUORESCENT MATERIAL AND FLUORESCENT LAMP USING SAME

[75] Inventors: Yuji Sugimoto, Yokosuka; Youhei Shimizu, Yokohama, both of Japan

[73] Assignee: Kabushiki Kaisha Toshiba, Kanagawa, Japan

[21] Appl. No.: 325,265

[22] PCT Filed: Feb. 25, 1994

[86] PCT No.: PCT/JP94/00305

§ 371 Date: Dec. 15, 1994

§ 102(e) Date: Dec. 15, 1994

[87] PCT Pub. No.: WO94/19422

PCT Pub. Date: Sep. 1, 1994

[30] Foreign Application Priority Data

Feb. 26, 1993 [JP] Japan .................... 5-037993

[51] Int. Cl.$^6$ .................................. C09K 11/78
[52] U.S. Cl. .................... 313/486; 252/301.4 R
[58] Field of Search ............... 313/486; 252/301.4 R

[56] References Cited

U.S. PATENT DOCUMENTS

| | | | |
|---|---|---|---|
| 3,668,142 | 6/1972 | Luckey .................. | 252/301.5 |
| 3,767,517 | 10/1973 | Williams .................. | 428/413 |
| 4,038,204 | 7/1977 | Wachtel .................. | 252/301 AP |
| 4,307,321 | 12/1981 | Pappalardo et al. .......... | 313/486 |
| 4,733,126 | 3/1988 | Yamakawa et al. .......... | 313/487 |
| 4,988,914 | 1/1991 | Rutfield et al. ............ | 313/486 |
| 5,394,055 | 2/1995 | Tono et al. ............... | 313/467 |

FOREIGN PATENT DOCUMENTS

| | | | |
|---|---|---|---|
| 55-161883 | 12/1980 | Japan ............ | C09K 11/477 |
| 56-99276 | 8/1981 | Japan ............ | C09K 11/78 |
| 58-52382 | 3/1983 | Japan ............ | C09K 11/465 |
| 58-127777 | 7/1983 | Japan ............ | C09K 11/465 |
| 59-45384 | 3/1984 | Japan ............ | C09K 11/40 |
| 61-266488 | 11/1986 | Japan ............ | C09K 11/78 |
| 63-128094 | 5/1988 | Japan ............ | C09K 11/78 |
| 57-207678 | 12/1992 | Japan ............ | C09K 11/475 |

OTHER PUBLICATIONS

International Search Report dated Apr. 26, 1994, for International Application No. PCT/JP94/00305.

*Primary Examiner*—Alvin E. Oberley
*Assistant Examiner*—Lawrence O. Richardson
*Attorney, Agent, or Firm*—Finnegan, Henderson, Farabow, Garrett & Dunner, L.L.P.

[57] ABSTRACT

A red light fluorescent material is disclosed which contains simultaneously phosphorus and at least one alkaline earth metal selected from among magnesium, calcium, strontium, and barium, each in an amount in the range of from $10^{-6}$ to $10^{-3}$ mol per mol of a europium-activated rare earth oxide fluorescent material substantially represented by the general formula, $(L_{1-x}Eu_x)_2O_3$, (wherein L stands for at least one element selected from among rare earth elements and x for a numerical value in the range of $0.01 \leq x \leq 0.20$). This red light fluorescent material possesses the nature of manifesting high initial luminescent brightness (efficiency) and entailing only slight decline of efficiency during the lighting of lamp. A fluorescent lamp has a fluorescent material layer formed as deposited on the inner wall surface of a glass tube and containing as at least a red luminescent component the fluorescent material mentioned above. This fluorescent lamp is capable of repressing the degradation of luminescent efficiency and luminescent chromaticity by aging.

9 Claims, 5 Drawing Sheets

FLUORESCENT MATERIAL AND FLUORESCENT LAMP USING SAME

TECHNICAL FIELD

This invention relates to a europium-activated rare earth oxide fluorescent material and fluorescent lamps using the fluorescent material, and more particularly to a red light emitting fluorescent material manifesting a high color-rendering property at high efficiency and proving to be advantageously usable as in three band type fluorescent lamps, for example, and fluorescent lamps using the fluorescent material.

BACKGROUND ART

It is universally known that a europium-activated yttrium oxide fluorescent material ($Y_2O_3$:Eu) excels in such fluorescent properties as brightness and color of the luminescence excited by an electron beam and an ultraviolet ray and, owing to this feature, finds utility as a red light component fluorescent material for color cathode ray tubes and as a red light component fluorescent material for three band type fluorescent lamps.

Various fluxes have been heretofore studied with a view to enabling such europium-activated rare earth oxide fluorescent material as mentioned above to acquire an exalted luminescent efficiency. For example, such compounds as lithium phosphate (refer to JP-A-56-99,276), borates of alkaline earth metals (refer to JP-A-55-161,883), aluminum phosphate (refer to JP-A-58-52,382), barium borate (refer to JP-A-59-45,384), oxides of alkaline earth metals (refer to JP-A-58-127,777), and barium fluoride.magnesium fluoride (refer to JP-A-61-266,488) have been proposed as fluxes for the europium-activated yttrium oxide fluorescent material.

The fluorescent material using such a flux as mentioned above acquires a conspicuous increase in crystal size and the fluorescent lamp using this fluorescent material enjoys an exalted initial luminescent efficiency. For the reason shown hereinbelow, however, the fluorescent lamp entails the problem that the luminescent efficiency thereof gradually dwindles with the elapse of the lighting time thereof.

The process for the manufacture (synthesis) of an ordinary fluorescent material includes a step of washing. The conventional flux is normally removed at this step of washing. In the case of the fluorescent material which is produced with such a flux as mentioned above, the decline of the luminescent efficiency with the elapse of the lighting time of the lamp may be logically explained by a postulate that a minute amount of this flux will remain therein after the washing step and the residual flux will gradually react with such component substances of the fluorescent lamp as glass and mercury.

When the red light fluorescent material has the luminescent efficiency thereof degraded by aging as described above, this degradation results in a decline of the luminescent brightness for the fluorescent lamp. In the three band type fluorescent lamp, the degradation entails an alteration of the luminescent chromaticity and inevitably impairs the quality of the fluorescent lamp seriously.

An object of this invention is to provide a red light fluorescent material which possesses high initial luminescent brightness (efficiency) and causes only a small degradation in the efficiency of the fluorescent lamp while in use. Another object of this invention is to provide a fluorescent lamp which uses this fluorescent material and consequently manifests high color-rendering property and high luminescent brightness while repressing the alteration of luminescent brightness and luminescent chromaticity by aging.

DISCLOSURE OF THE INVENTION

The present inventors performed various studies on this problem of the residual flux for the purpose of improving the luminescent efficiency of the europium-activated rare earth oxide fluorescent material and further preventing the luminescent efficiency from being degraded by aging. As a result, it has been ascertained that when phosphorus and an alkaline earth metal are simultaneously contained at fixed rates, they prevent the residual flux from reacting with the component substances of the fluorescent lamp and greatly diminish or eliminate the degradation of the luminescent efficiency of the europium-activated rare earth oxide fluorescent material due to the elapse of the lighting time.

This invention has been perfected based on the knowledge mentioned above. The fluorescent material of this invention is a europium-activated rare earth oxide fluorescent material substantially represented by the general formula:

$$(L_{1-x}Eu_x)_2O_3 \qquad (1)$$

(wherein L stands for at least one element selected from among the rare earth elements and x for a numerical value falling in the range of $0.01 \leq x \leq 0.20$) and characterized by containing phosphorus and at least one alkaline earth metal selected from among magnesium, calcium, strontium, and barium, each at a ratio in the range of from $10^{-6}$ to $10^{-3}$ mol, per mol of the europium-activated rare earth oxide fluorescent material mentioned above.

The fluorescent lamp of this invention is a fluorescent lamp which is provided with a fluorescent material layer formed as deposited on the inner wall surface of a glass tube and is characterized in that the fluorescent material layer contains at least as a red light component thereof a fluorescent material containing phosphorus and at least one alkaline earth metal selected from among magnesium, calcium, strontium, and barium, each at a ratio in the range of from $10^{-6}$ to $10^{-3}$ mol, per mol of the europium-activated rare earth oxide substantially represented by the formula (1) mentioned above.

The fluorescent material of this invention is basically formed of a rare earth oxide fluorescent material activated with trivalent europium. The reference symbol L used in the formula (1) mentioned above represents rare earth elements including yttrium. Specifically, it stands for at least one rare earth element selected from among yttrium (Y), gadolinium (Gd), lanthanum (La), and lutecium (Lu). The content of europium in the europium-activated rare earth oxide fluorescent material, as the value of x in the formula (1) mentioned above, is in the range of from 0.01 to 0.20. If the europium content is less than 0.01 as the value of x, the concentration of the activating agent is unduly low and the luminescent intensity is insufficient. If this content exceeds 0.20, the luminescent brightness is degraded by concentration quenching.

For the fluorescent material of this invention, the ratios of the contents of phosphorus and the alkaline earth metal to the amount of the rare earth oxide fluorescent material activated with trivalent europium as represented by the formula (1) mentioned above constitute one important factor. It is important that phosphorus and the alkaline earth metal should be simultaneously contained each at a proportion in the range of from $10^{-6}$ to $10^{-3}$ mol per mol of the fluorescent material mentioned above.

If the content of either phosphorus or the rare earth metal is smaller than $10^{-6}$ mol per mol of the europium-activated rare earth oxide fluorescent material, the initial luminescent brightness will be unduly low. If the content of either of the two elements under consideration exceeds $10^{-3}$ mol, the decline of the luminescent efficient will exacerbate. By causing the contents of phosphorus and the alkaline earth metal each to fall in the range of from $10^{-6}$ to $10^{-3}$ mol per mol of the fluorescent material, a stable compound is produced between the phosphorus and the alkaline earth metal to permit satisfaction of high luminescent brightness and repression of the degradation of luminescent efficiency by aging as well. More desirably, the contents of phosphorus and the alkaline earth metal each fall in the range of from $10^{-6}$ to $10^{-4}$ mol per mol of the europium-activated rare earth oxide fluorescent material mentioned above.

The effect of the simultaneous addition of phosphorus and the alkaline earth metal mentioned above can be attained so long as this alkaline earth metal is at least one member selected from among magnesium, calcium, strontium, and barium. In these alkaline earth metals, barium and calcium prove particularly desirable from the viewpoint of initial luminescent brightness and alteration of luminescent brightness by aging.

The red light fluorescent material of this invention can be produced as follows, for example.

First, the starting materials such as a rare earth element oxide like yttrium oxide and various additive components are prepared. The europium sources usable herein include europium oxide and europium carbonate and the phosphorus sources include phosphates and hydrogen phosphates of such alkaline earth metals as Mg, Ca, Sr, and Ba. The alkaline earth metal sources usable herein include oxides, hydroxides, and carbonates of alkaline earth metals which are easily converted at elevated temperatures into oxides of alkaline earth metals.

Then these starting materials are weighed out so as to satisfy stoichiometrically the formula (1) mentioned above and, at the same time, satisfy the condition that $10^{-6}$ to $10^{-3}$ mol of phosphorus and $10^{-6}$ to $10^{-3}$ mol of the alkaline earth metal should be simultaneously contained per mol of a europium-activated rare earth oxide fluorescent material represented by the formula (1) mentioned above and are then thoroughly mixed to obtain a mixture as a raw material for the fluorescent material. This mixing may be carried out in a wet state by the use of a ball mill, a mixer mill, or a mortar or in a dry state by the use of water or alcohol.

The fluorescent material of this invention may be enabled to contain therein phosphorus and an alkaline earth metal by positively adding a phosphorus source and an alkaline earth metal source as starting materials in the process for manufacture of a europium-activated rare earth oxide fluorescent material. Alternatively, phosphorus and an alkaline earth metal may be added to form a flux in the europium-activated rare earth oxide fluorescent material and their residual amounts after the washing step may be adjusted. To be specific, a phosphorus-containing flux selected from among phosphorus oxide ($P_2O_3$), lithium phosphate, and aluminum phosphate and an alkaline earth metal-containing flux selected from among borates, fluorides, and oxides of alkaline earth metals are added to the mixture as the raw material for the fluorescent material and adjusting the amounts of these fluxes to be added and the process of manufacture so that phosphorus and an alkaline earth metal may be contained in the ranges mentioned above in the finally produced fluorescent material. Otherwise, the manufacture of the fluorescent material of this invention may be implemented by using either of the fluxes mentioned above per se and, at the same time, adding the remainder reflux to the starting materials. Then, the mixture as the raw material for the fluorescent material mentioned above is packed in a refractory vessel such as an alumina crucible or a quartz crucible and subjected to firing therein. This firing is carried out once or twice or more times in air (oxidative atmosphere), a neutral atmosphere such as an atmosphere of nitrogen gas or an atmosphere of argon gas, or a reducing atmosphere such as an atmosphere of nitrogen gas containing a small amount of hydrogen gas at a temperature in the range of from 1000° C. to 1350° C., preferably from 1200° C. to 1300° C. The firing time is variable with such factors as the amount of the mixture as the raw material for the fluorescent material to be packed in the refractory vessel and the firing temperature. Generally, when the firing temperature is in the range mentioned above, the firing time which proves proper is in the range of from 0.5 to 6 hours, preferably from 1 to 4 hours. After the firing, the fired process is pulverized, washed (as with water, a weak mineral acid, a weak alkali, or a weak organic acid), dried, and classified by the use of a sieve as generally practiced in the process for manufacture of a fluorescent material. Thus, the fluorescent material of this invention is obtained.

The fluorescent lamp of this invention is possessed of a fluorescent material layer containing at least as a red luminescent component the fluorescent material of this invention described above. This fluorescent material layer may be formed solely of the fluorescent material of this invention. It may be otherwise formed of a mixed fluorescent material consisting of a red light fluorescent material of this invention with a red light fluorescent material and a green light fluorescent material or a mixed fluorescent material optionally further incorporating therein a deep red light fluorescent material and a bluish green light fluorescent material. The fluorescent material layer may be used in various forms.

The fluorescent lamp of this invention is particularly suitable for the so-called three band type fluorescent lamp which uses such a mixed fluorescent material as mentioned above. When it is utilized for the three band type fluorescent lamp of the kind mentioned above, various blue light fluorescent materials and green light fluorescent materials heretofore known to the art may be used besides the red light fluorescent material of this invention.

MODE FOR EMBODYING THE INVENTION

Now, the present invention will be described below with reference to working examples.

EXAMPLES 1 TO 4

For the manufacture of europium-activated yttrium oxide fluorescent materials represented by the composition formula, $(Y_{0.95}Eu_{0.05})_2O_3$, phosphorus sources and strontium sources were mixed at suitable ratios with starting materials to obtain a plurality of fluorescent materials having a fixed phosphorus concentration and a varying strontium concentration.

Specifically, 214.7 g of yttrium oxide [$Y_2O_3$] and 17.6 g of europium oxide [$Eu_2O_3$] were weighed out and combined with 0.015 g of ammonium phosphate [$(NH_4)_3HPO_4$] and further with a varying amount of strontium oxide [SrO] and they were thoroughly mixed. Then, the resultant mixture was packed in an alumina crucible and fired therein in an oxidizing atmosphere at 1350° C. The fired process consequently obtained was subjected to such ordinary treatments as pulverization, dispersion, washing, drying, and classification with a sieve to obtain a fluorescent material. Thus, phosphorus was contained in a fixed proportion of $10^{-5}$ mol and strontium was contained in varying proportions of $10^{-7}$ mol (Comparative Example 1), $10^{-6}$ mol. (Example 1), $10^{-5}$ mol (Example 2), $10^{-4}$ mol (Example 3), $10^{-3}$ mol (Example 4), and $2\times10^{-3}$ mol (Comparative Example 2), respectively per mol of the europium-activated yttrium oxide fluorescent material represented by the composition formula mentioned above.

Figure 1:
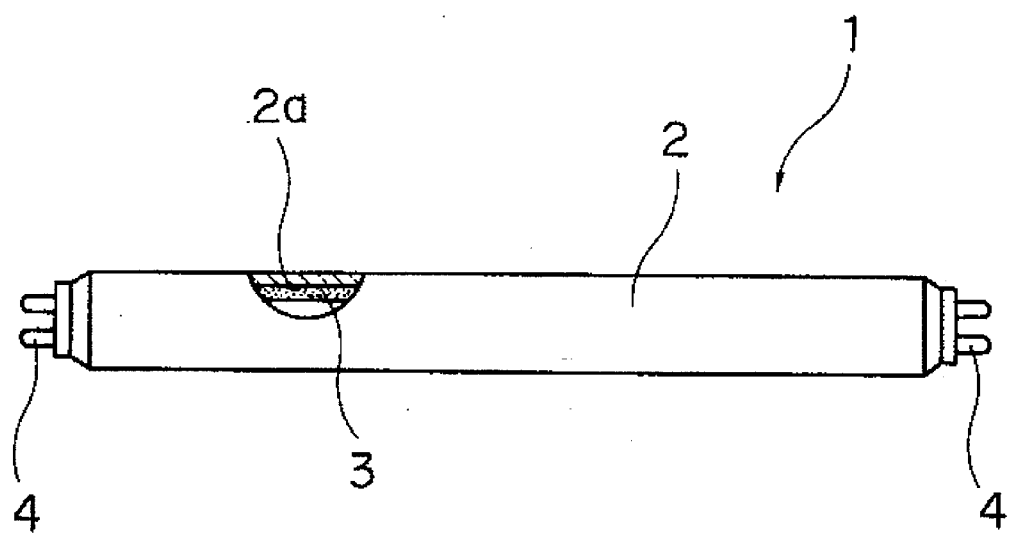
FIG. 1 is a partially cutaway view showing the construction of a fluorescent lamp manufactured in a working example of this invention.

Then, fluorescent lamps (FL20SS/18) of a construction shown in FIG. 1 were produced by an ordinary method using the various fluorescent materials which were obtained in Examples 1 to 4 and Comparative Examples 1 and 2. In a fluorescent lamp 1 shown in FIG. 1, a fluorescent material layer 3 was formed as deposited on an inner wall surface 2a of a glass bulb 2. A discharge gas of a prescribed pressure, namely a mixed gas of mercury with such a rare gas as argon, was sealed in the glass bulb 2. Electrodes 4 were attached one each to opposite end parts of the glass bulb 2. By the application of a prescribed voltage between these electrodes 4, the fluorescent material layer 3 was caused by an excitation source to emit light.

Figure 2A:
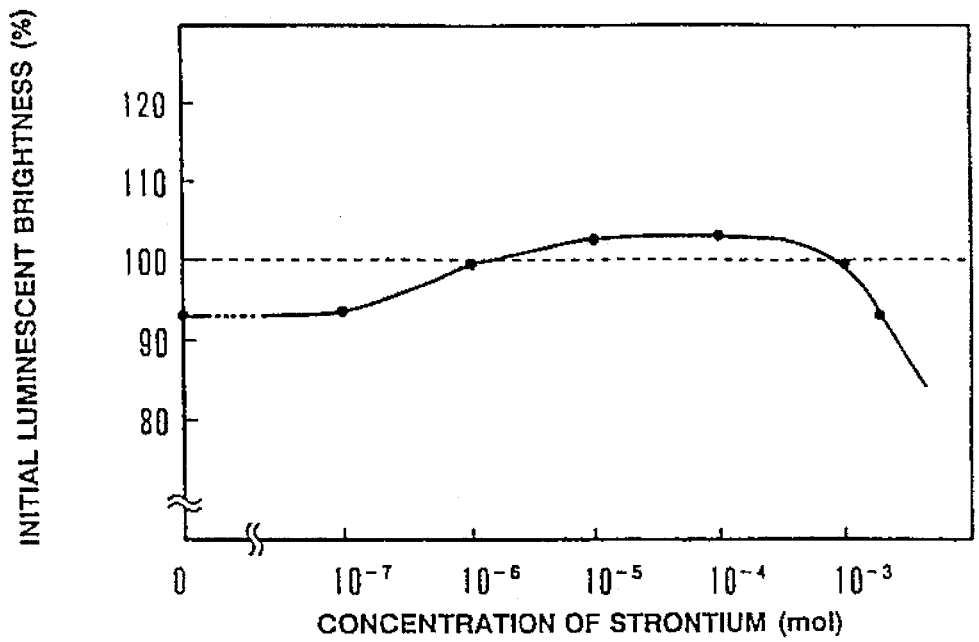
FIGS. 2a and 2b are graphs showing the characteristics of fluorescent lamps using fluorescent materials obtained in working examples of this invention and comparative examples; the graph of FIG. 2a showing the relation between the strontium concentration of a europium-activated yttrium oxide fluorescent material containing $10^{-5}$ mol of phosphorus and the initial luminescent brightness of the fluorescent material and the graph of FIG. 2b similarly showing the relation between the strontium concentration and the luminescent brightness after 1000 hours' lighting of the lamp.
Figure 2B:
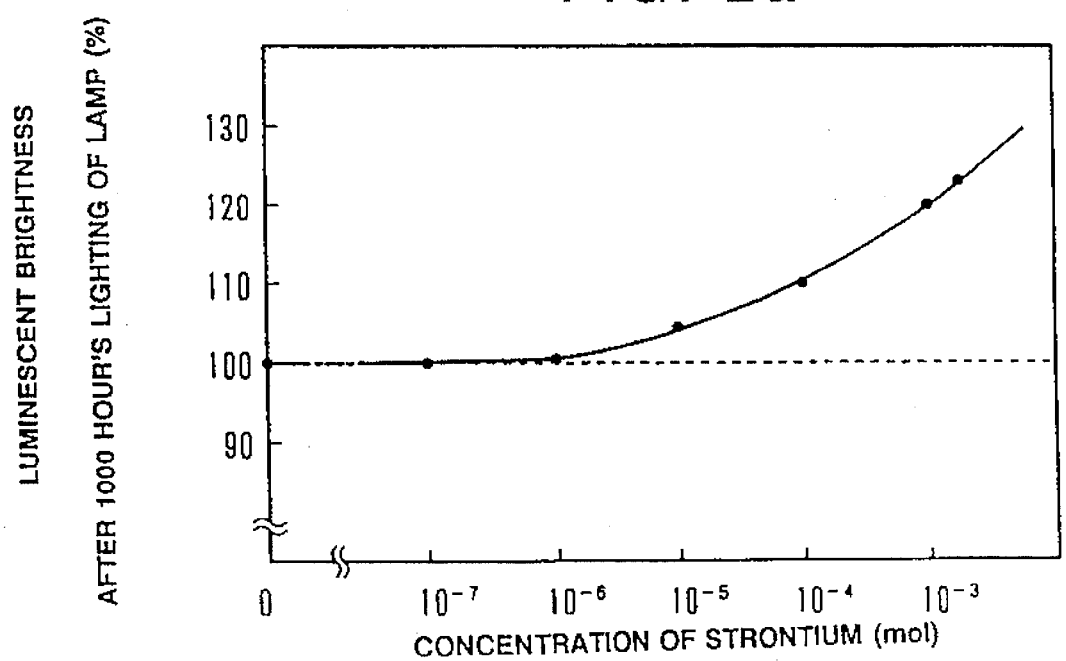

The various fluorescent lamps obtained as described above were tested for initial luminescent brightness and for luminescent brightness after 1000 hours' lighting of the lamps. The results of the test are shown in FIGS. 2a and 2b. The magnitudes of luminescent brightness indicated in these graphs represent relative values (%) determined based on the luminescent brightness of the europium-activated yttrium oxide fluorescent material including neither phosphorus nor strontium [$(Y_{0.95}Eu_{0.05})_2O_3$] taken as 100.

It is clearly noted from the graphs of FIGS. 2a and 2b that the strontium concentration is desired to be not more than $10^{-3}$ mol from the viewpoint of the initial luminescent brightness and to be not less than $10^{-6}$ mol from the viewpoint of the luminescent brightness respectively, per mol of the europium-activated yttrium oxide fluorescent material. It is also confirmed that fluorescent lamps excelling in both initial luminescent brightness and luminescent brightness after 1000 hours' lighting of lamp are obtained by using fluorescent materials of the working examples simultaneously containing $10^{-5}$ mol of phosphorus and $10^{-6}$ to $10^{-3}$ mol of strontium.

EXAMPLES 5 TO 8

Fluorescent materials containing barium at a fixed proportion of $10^{-5}$ mol and phosphorus at varying proportions of $10^{-7}$ mol (Comparative Example 3) $10^{-6}$ mol (Example 5), $10^{-5}$ (Example 6), $10^{-4}$ mol (Example 7), $10^{-3}$ mol (Example 8), and $2\times10^{-3}$ mol (Comparative Example 4), respectively per mol of a europium-activated yttrium oxide fluorescent material of the composition formula, $(Y_{0.94}Eu_{0.06})_2O_3$, were prepared by suitably adjusting the mixing rations of various starting materials and following the procedure of Example 1.

Figure 3A:
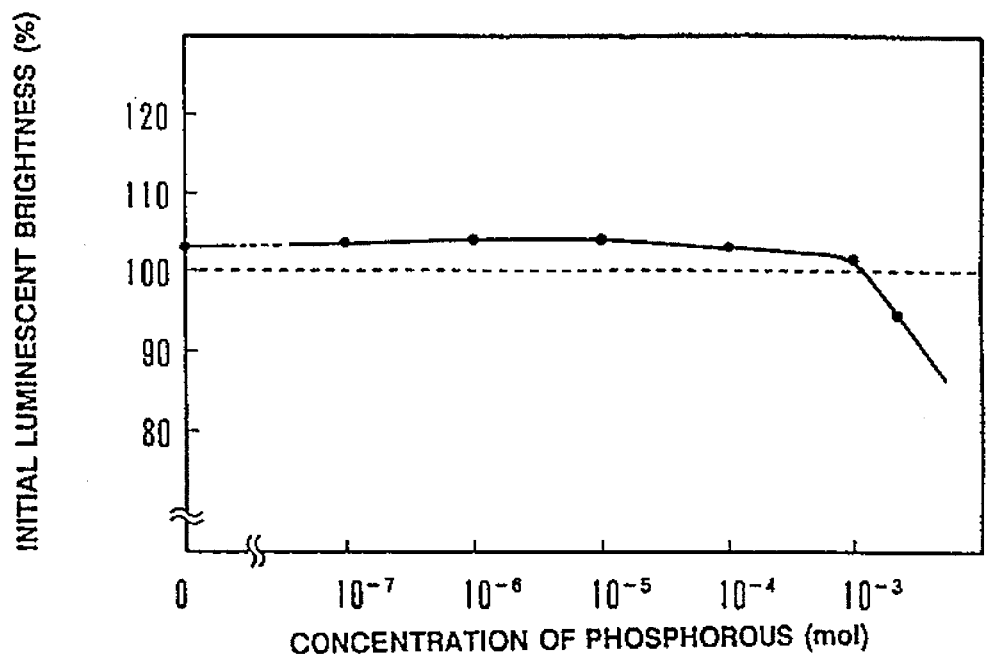
FIGS. 3a and 3b are graphs showing the characteristics of fluorescent lamps using fluorescent materials obtained in other working examples of this invention and other comparative examples; the graph FIG. 3a showing the relation between the phosphorus concentration of a europium-activated yttrium oxide fluorescent material containing $10^{-5}$ mol of barium and the initial luminescent brightness of the fluorescent material and the graph FIG. 3b similarly showing the phosphorus concentration and the luminescent brightness after 1000 hours' lighting of the lamp.
Figure 3B:
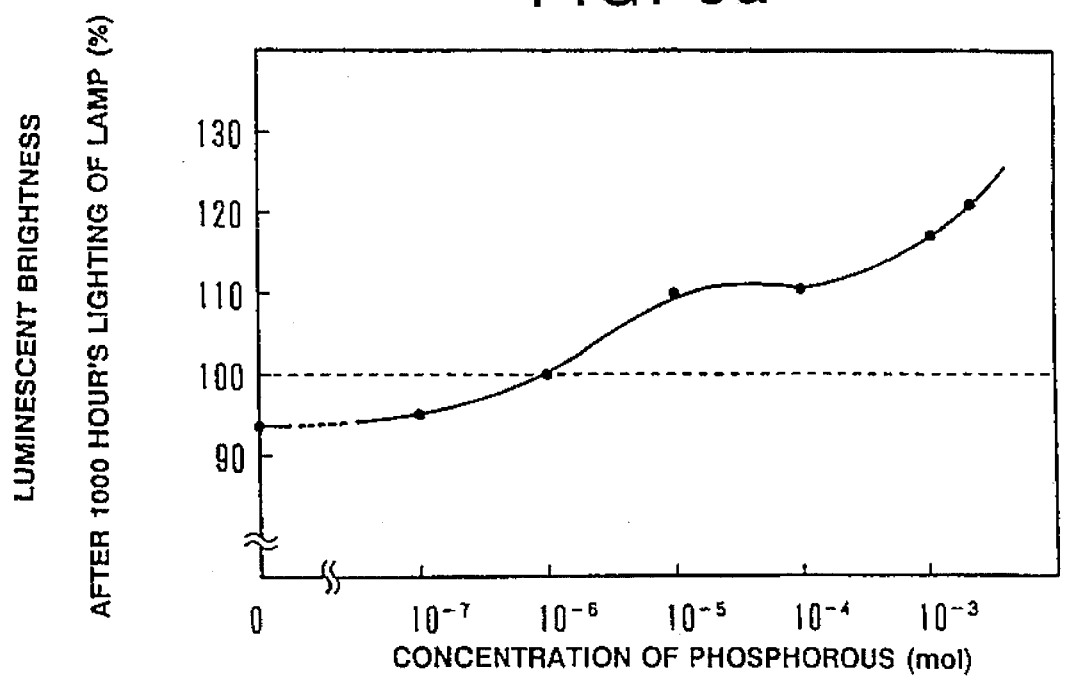

Then, fluorescent lamps (FL20SS/18) similar to those of Example 1 were produced by an ordinary method using the fluorescent materials which were obtained in Examples 5 to 8 and Comparative Examples 3 and 4. These fluorescent lamps were tested for initial luminescent brightness and luminescent brightness after 1000 hours' lighting of lamp. The results of the test are shown in FIGS. 3a and 3b. The magnitudes of luminescent brightness indicated in these graphs represent the relative values (%) determined based on the luminescent brightness of a conventional europium-activated yttrium oxide fluorescent material including neither phosphorus nor strontium [$(Y_{0.94}Eu_{0.06})_2O_3$] taken as 100.

It is clearly noted from the graphs of FIGS. 3a and 3b that fluorescent lamps excelling in both initial luminescent brightness and luminescent brightness after 1000 hours' lighting of lamp are obtained by using fluorescent materials of the working examples simultaneously containing $10^{-5}$ mol of barium and $10^{-6}$ to $10^{-3}$ mol of phosphorus per mol of the europium-activated yttrium oxide fluorescent material.

EXAMPLES 9 TO 12

Fluorescent materials containing phosphorus at a fixed proportion of $10^{-5}$ mol and magnesium at varying proportions of $10^7$ mol (Comparative Example 5), $10^{-6}$ mol (Example 9), $10^{-5}$ mol (Example 10), $10^{-4}$ mol (Example 11), $10^{-3}$ mol (Example 12), and $2\times10^{-3}$ mol (Comparative Example 6), respectively per mol of a europium-activated yttrium oxide fluorescent material represented by the composition formula, $(Y_{0.95}Eu_{0.05})_2O_3$, by suitably adjusting the mixing ratios of the various starting materials and following the procedure of Example 1.

Figure 4A:
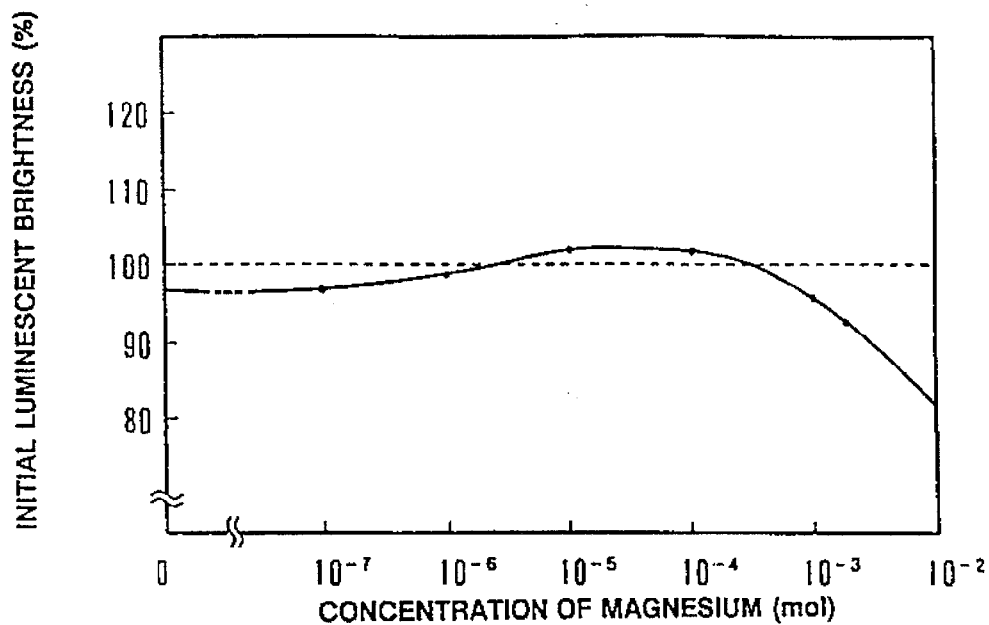
FIGS. 4a and 4b are graphs showing the characteristics of fluorescent lamps using fluorescent materials obtained in yet other working examples of this invention and yet other comparative examples; the graph of FIG. 4a showing the relation between the magnesium concentration of a europium-activated yttrium oxide fluorescent material containing $10^{-5}$ mol of phosphorus and the initial luminescent brightness of the fluorescent material and the graph of FIG. 4b similarly showing the relation between the magnesium concentration and the luminescent brightness after 1000 hours, lighting of the lamp.
Figure 4B:
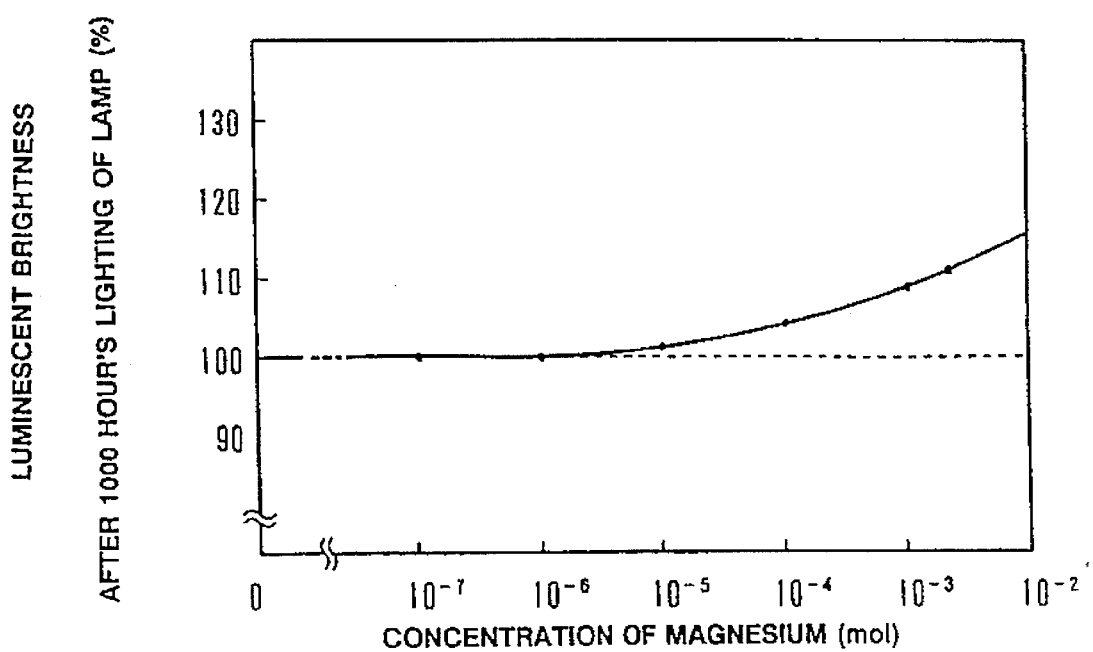

Then, fluorescent lamps (FL20SS/18) similar to those of Example 1 were produced by an ordinary method using the various fluorescent materials which were obtained in Examples 9 to 12 and Comparative Examples 5 and 6. These fluorescent lamps were tested for initial luminescent brightness and luminescent brightness after 1000 hours' lighting of lamp. The results of the test are shown in FIGS. 4a and 4b. The magnitudes of luminescent brightness indicated in the graphs represent the relative values (%) determined based on the luminescent brightness of a conventional europium-activated yttrium oxide fluorescent material containing neither phosphorus nor magnesium [$(Y_{0.95}Eu_{0.05})_2O_3$] taken as 100.

It is clearly noted from the graph of FIGS. 4a and 4b that fluorescent lamps excelling in both initial luminescent brightness and luminescent brightness after 1000 hours' lighting of lamp are obtained by using fluorescent materials of the working examples simultaneously containing $10^{-5}$ mol of phosphorus and $10^{-6}$ to $10^{-3}$ mol of magnesium per mol of the europium-activated yttrium oxide fluorescent material.

EXAMPLES 13 TO 16

Fluorescent materials containing calcium at a fixed proportion of $10^{-5}$ mol and phosphorus at varying proportions of $10^{-7}$ mol (Comparative Example 7), $10^{-6}$ mol (Example 13), $10^{-5}$ mol (Example 14), $10^{-4}$ mol (Example 15), $10^{-3}$ mol (Example 16), and $2\times10^{-3}$ mol (Comparative Example 8), respectively per mol of a europium-activated yttrium oxide fluorescent material represented by the composition formula, $(Y_{0.93}Eu_{0.07})_2O_3$, by suitably adjusting the mixing ratios of the various starting materials and following the procedure of Example 1.

Figure 5A:
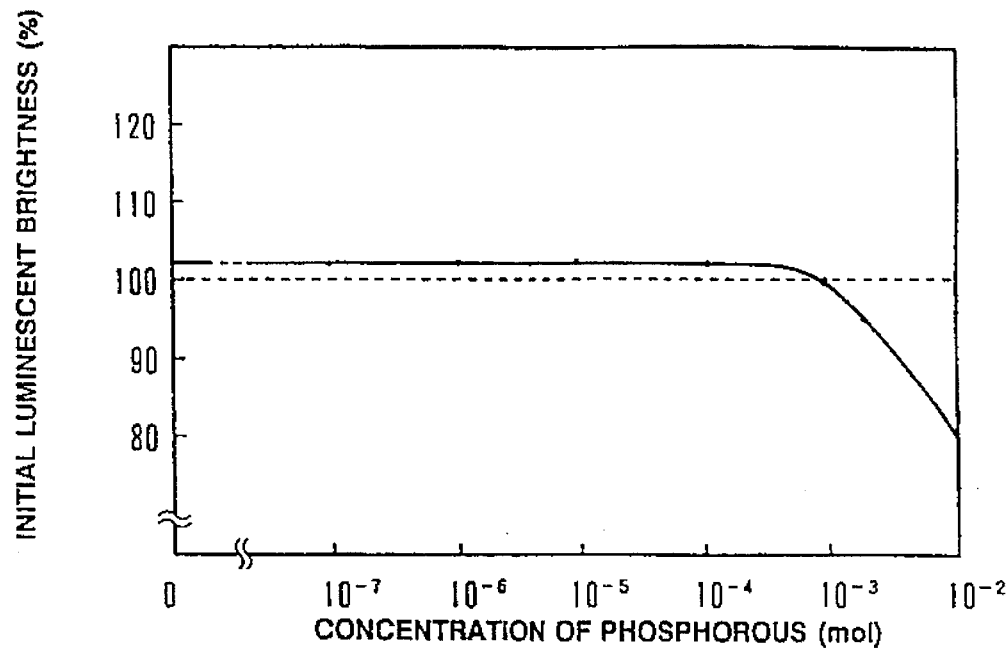
FIGS. 5a and 5b are graphs showing the characteristics of fluorescent lamps using fluorescent materials obtained in still other working examples of this invention and still other comparative examples; the graph of FIG. 5a showing the relation between the phosphorus concentration of a europium-activated yttrium oxide fluorescent material containing $10^{-5}$ mol of calcium and the initial luminescent brightness of the fluorescent material and the graph FIG. 5b similarly showing the relation between the phosphorus concentration and the luminescent brightness after 1000 hours' lighting of the lamp.
Figure 5B:
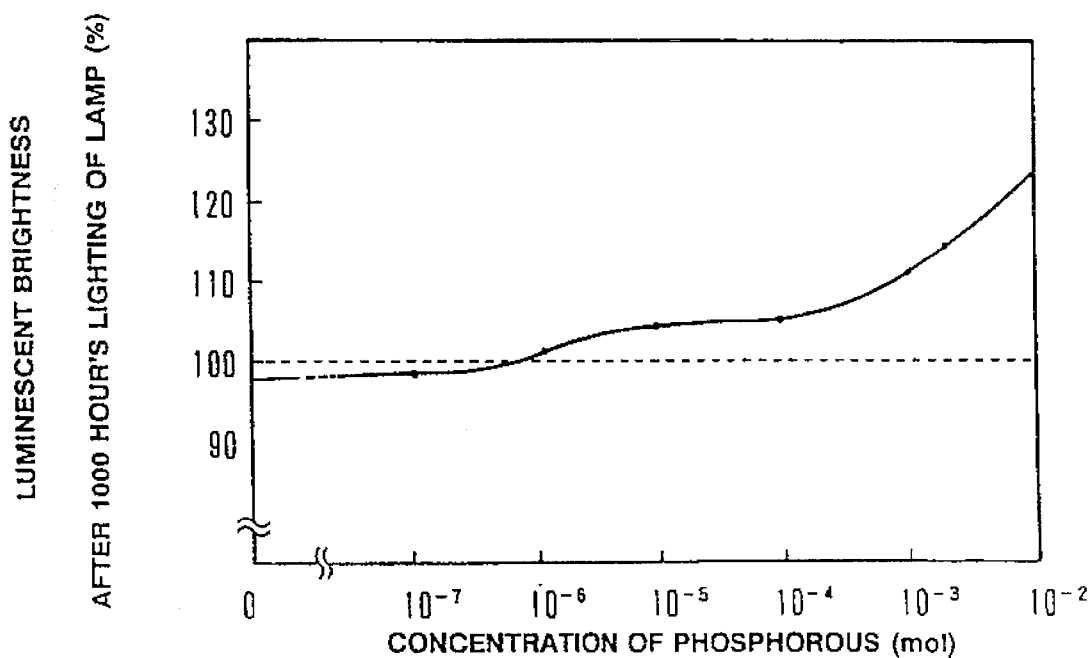

Then, fluorescent lamps (FL20SS/18) similar to those of Example 1 were produced by an ordinary method using the various fluorescent materials which were obtained in Examples 13 to 16 and Comparative Examples 7 and 8. These fluorescent lamps were tested for initial luminescent brightness and luminescent brightness after 1000 hours' lighting of lamp. The results of the test are shown in FIGS. 5a and 5b. The magnitudes of luminescent brightness indicated in the graphs represent the relative values (%) determined based on the luminescent brightness of a conventional europium-activated yttrium oxide fluorescent material containing neither phosphorus nor calcium [$(Y_{0.93}Eu_{0.07})_2O_3$] taken as 100.

It is clearly noted from the graph of FIGS. 5a and 5b that fluorescent lamps excelling in both initial luminescent brightness and luminescent brightness after 1000 hours' lighting of lamp are obtained by using fluorescent materials of the working examples simultaneously containing $10^{-5}$ mol of calcium and $10^{-6}$ to $10^{-3}$ mol of phosphorus per mol of the europium-activated yttrium oxide fluorescent material.

EXAMPLE 17

A europium-activated gadolinium oxide fluorescent material represented by the composition formula, $(Gd_{0.95}Eu_{0.05})_2O_3$, was prepared by the same method as used in Example 2 so as to contain $10^{-5}$ mol of phosphorus and $10^{-6}$ mol of strontium therein per mol of the europium-activated gadolinium oxide fluorescent material.

A fluorescent lamp (FL20SS/18) similar to that of Example 1 was produced by an ordinary method using the fluorescent material consequently obtained and then tested for initial luminescent brightness and luminescent brightness after 1000 hours' lighting of lamp. The test yielded satisfactory results, 102 and 103, respectively based on the luminescent brightness of a conventional europium-activated yttrium oxide fluorescent material [$(Gd_{0.95}Eu_{0.05})_2O_3$] containing neither phosphorus nor strontium taken as 100.

It is clearly noted from this working example that a fluorescent lamp excelling in both initial luminescent brightness and luminescent brightness after 1000 hours' lighting of lamp is obtained by causing an europium-activated gadolinium oxide fluorescent material to contain both phosphorus and strontium.

EXAMPLE 18

By the same method as used in Example 2, a europium-activated rare earth oxide fluorescent material represented by the composition formula, $(Y_{0.8}Gd_{0.15}Eu_{0.05})_2O_3$, was prepared so as to contain $10^{-5}$ mol of phosphorus and $10^{-6}$ mol of strontium per mol of the europium-activated rare earth oxide fluorescent material.

A fluorescent lamp (FL20SS/18) similar to that of Example 1 was produced by using the fluorescent material consequently obtained and then tested for initial luminescent brightness and luminescent brightness after 1000 hours' lighting of lamp. The test yielded satisfactory results, 101 and 102, respectively based on the luminescent brightness of a conventional europium-activated yttrium oxide fluorescent material [$(Y_{0.8}Gd_{0.15}Eu_{0.05})_2O_3$] containing neither phosphorus nor strontium taken as 100.

It is clearly noted from this working example that a fluorescent lamp excelling in both initial luminescent brightness and luminescent brightness after 1000 hours' lighting of lamp is obtained by causing an europium-activated rare earth oxide fluorescent material to contain both phosphorus and strontium.

The working examples cited above represent cases of applying this invention to rare earth oxide fluorescent materials using yttrium oxide and gadolinium oxide, for instance. The same effect of this invention as described above is attained in rare earth oxide fluorescent materials using lanthanum oxide ($La_2O_3$), lutecium oxide ($Lu_2O_3$), and mixed crystals thereof [such as, for example, $(Y_{0.9}La_{0.1})_2O_3$].

Industrial Applicability

As described above, this invention allows provision of a red light fluorescent material which manifests high luminescent brightness and suffers from only slight decline of luminescent brightness of lighting lamp by aging. By using this fluorescent material as a red luminescent component in a three band type fluorescent lamp, a fluorescent lamp which not only manifests high luminescent brightness but also excels in stability of lighting lamp to resist the effect of aging can be realized.

We claim:

1. A fluorescent material consisting essentially of:

a europium-activated rare earth oxide represented by the formula:

$$(L_{1-x}Eu_x))_2O_3,$$

wherein L is at least one element selected from the group consisting of rare earth elements and x is a numerical value in the range of $0.01 \leq x \leq 0.20$;

phosphorus; and an alkaline earth metal consisting of at least one element selected from the group consisting of magnesium, calcium, strontium, and barium, wherein said phosphorus and said alkaline earth metal are each present in an amount ranging from $10^{-6}$ to $10^{-3}$ mol per 1 mol of the europium-activated rare earth oxide.

2. A fluorescent material according to claim 1, wherein the rare earth element L is at least one element selected from the group consisting of yttrium, gadolinium, lanthanum, and lutecium.

3. A fluorescent material according to claim 2, wherein the rare earth element L is yttrium and gadolinium, or gadolinium.

4. A fluorescent material according to claim 1, wherein the alkaline earth metal is magnesium.

5. A fluorescent material according to claim 1, wherein the alkaline earth metal is calcium.

6. A fluorescent material according to claim 1, wherein the alkaline earth metal is strontium.

7. A fluorescent material according to claim 1, wherein the alkaline earth metal is barium.

8. A fluorescent lamp comprising, a glass tube and a fluorescent material layer formed on an inner wall surface of said glass tube, wherein said fluorescent material layer contains as at least a red luminescent component thereof, said red luminescent component consisting essentially of:

a europium-activated rare earth oxide represented by the formula:

$$(L_{1-x}Eu_x)_2O_3,$$

wherein L is at least one element selected from the group consisting of rare earth elements and x is a numerical value in the range of $0.01 \leq x \leq 0.20$;

phosphorus; and an alkaline earth metal consisting of at least one element selected from the group consisting of magnesium, calcium, strontium, and barium, wherein said phosphorus and said alkaline earth metal are each present in an amount ranging from $10^{-6}$ to $10^{31\ 3}$ mol per 1 mol of the europium-activated rare earth oxide.

9. A fluorescent lamp according to claim 4, wherein the lamp is utilized for a three band type fluorescent lamp.

* * * * *

UNITED STATES PATENT AND TRADEMARK OFFICE
CERTIFICATE OF CORRECTION

PATENT NO. : 5,585,692
DATED : December 17, 1996
INVENTOR(S) : Yuji SUGIMOTO et al.

It is certified that error appears in the above-indentified patent and that said Letters Patent is hereby corrected as shown below:

Claim 1, column 9, line 10, "$(L_{1-x}Eu_x))_2O_3$," should read --$(L_{1-x}Eu_x)_2O_3$,--.

Claim 8, column 10, line 28, "$10^{31\ 3}$" should read --$10^{-3}$--.

Signed and Sealed this

Twentieth Day of May, 1997

Attest:

BRUCE LEHMAN

Attesting Officer     Commissioner of Patents and Trademarks